United States Patent
Petrone et al.

(10) Patent No.: US 7,802,723 B2
(45) Date of Patent: Sep. 28, 2010

(54) SYSTEM AND METHOD FOR NAMELESS BIOMETRIC AUTHENTICATION AND NON-REPUDIATION VALIDATION

(75) Inventors: James F. Petrone, Carefree, AZ (US); Mark S. Merkow, Tempe, AZ (US)

(73) Assignee: American Exrpess Travel Related Services Company, Inc., New York, NY (US)

( * ) Notice: Subject to any disclaimer, the term of this patent is extended or adjusted under 35 U.S.C. 154(b) by 1071 days.

(21) Appl. No.: 11/108,807

(22) Filed: Apr. 19, 2005

(65) Prior Publication Data

US 2007/0175986 A1    Aug. 2, 2007

(51) Int. Cl.
*G06K 5/00* (2006.01)
(52) U.S. Cl. ..................................... 235/382
(58) Field of Classification Search ........... 235/382
See application file for complete search history.

(56) References Cited

U.S. PATENT DOCUMENTS

| 2005/0160052 A1* | 7/2005 | Schneider et al. ............. 705/67 |
| 2006/0090079 A1* | 4/2006 | Oh et al. ..................... 713/186 |

FOREIGN PATENT DOCUMENTS

| WO | 2004/001562 A2 | 12/2003 |
| WO | 2004/077346 A1 | 9/2004 |

* cited by examiner

*Primary Examiner*—Seung H Lee
*Assistant Examiner*—Tae Kim
(74) *Attorney, Agent, or Firm*—Snell & Wilmer L.L.P.

(57) ABSTRACT

A system, method, and computer program product for authenticating a requestor using a previously-stored biometric print. Records are stored in a database, where each record contains a previously-stored biometric print corresponding to an individual and is disassociated from an identity of the individual. An identifier and a biometric sample are requested from the requester. The identifier is then used to locate one of the plurality of records corresponding to the requestor. The requestor is authenticated if the biometric sample matches the previously-stored biometric print.

9 Claims, 7 Drawing Sheets

SYSTEM AND METHOD FOR NAMELESS BIOMETRIC AUTHENTICATION AND NON-REPUDIATION VALIDATION

BACKGROUND OF THE INVENTION

1. Field of the Invention

The present invention relates to identification authentication and more particularly to using biometrics as a factor for authentication.

2. Related Art

Although user identifiers and passwords are the most common method for accessing computer resources, they are widely recognized as the weakest form of authentication. Research and development in a new type of identification technique, called biometric identification, has created a new form of user authentication. A biometric identification system identifies a human from a measurement of a physical (i.e., biological) feature or repeatable action of the individual, such as hand geometry, retinal scan, iris scan, fingerprint patterns, facial characteristics, DNA sequence characteristics, voice prints, hand-written signature and the like.

Privacy issues, potential identity and/or biometric print theft and other concerns have inhibited widespread acceptance of using biometrics as a factor in authentication. Among these concerns are the level of invasiveness and physical and/or psychological discomfort during the enrollment and usage phases. In addition to the more obvious concerns of health issues, there is a perceived notion that biometric data could be stolen and identities could be forged. For example, retina scanning systems may enable the exchange of body fluids through the use of the eyepiece. The exchanged body fluids could then possibly be stolen and then forged.

Notwithstanding the above concerns, many entities are beginning to embrace biometrics as a second factor in the authentication process. For example, financial-services firms are interested in biometrics for performing background checks on prospective hires and for verifying customer transactions (particularly, credit, charge, debit, stored value and prepaid card transactions). In addition, many entities are requiring second factor authentication for more sensitive transactions such as the transfer of funds, high-value financial transactions, accessing personal medical records, and the like.

In most conventional biometric databases, however, in addition to a biometric, a user's name, address, social security number and the like are also stored. If the technological measures controlling access to the database are defeated, an individual's personal information can be stolen. This is commonly known as "identity theft". Other conventional biometric systems use the biometric feature as well as an individual's personal information in the same transaction. Because the personal information is accessible during the transaction, there is the possibility that it can be compromised.

Given the foregoing, what is needed is a system, method and computer program product for nameless biometric authentication and non-repudiation validation.

BRIEF DESCRIPTION OF THE INVENTION

The present invention meets the above-identified needs by providing a system, method and computer program product for nameless biometric authentication and non-repudiation validation.

In accordance with one embodiment of the present invention, there is provided a computer program product including a computer usable medium having control logic stored therein for causing a computer to authenticate a requestor using a previously-stored biometric print. The control logic includes code for causing the computer to store records in a database, each record containing a previously-stored biometric print corresponding to an individual and being disassociated from an identity of the individual. Also included is computer readable program code for causing the computer to request an identifier and a biometric sample from the requestor. The computer readable program also includes code for causing the computer to use the identifier to locate the records corresponding to the requester, and to authenticate the requestor if the biometric sample matches the previously-stored biometric print.

In accordance with another embodiment of the present invention, there is provided a method for causing a computer to authenticate a requestor using a previously-stored biometric print, including storing records in a database, each record containing a previously-stored biometric print corresponding to an individual and being disassociated from an identity of the individual. The method further includes requesting an identifier and a biometric sample from the requestor. The method further provides for locating one of the records corresponding to the requester using the identifier, and authenticating the requestor if the biometric sample matches the previously-stored biometric print.

In accordance with yet another embodiment of the present invention, there is provided a system for authenticating a requestor using a previously-stored biometric print. The system includes a database for storing records, each record containing a previously-stored biometric print corresponding to an individual and being disassociated from an identity of the individual. The system further includes a query engine operable to request a user identifier and a biometric sample from the requestor. Also included is an authentication engine operable to use the identifier to locate the record corresponding to the requestor, and to authenticate the requestor if the biometric sample matches the previously-stored biometric print.

In the above-mentioned embodiments, an authenticated requestor is permitted to perform a requested transaction.

In another embodiment of the present invention, there is a computer program product comprising a computer usable medium having control logic stored therein for causing a computer to enroll an individual into a biometric authentication system. The control logic includes computer readable program code for causing the computer to request an identifier from the individual, and create a record in a database at a location indexed by the identifier, the record being disassociated from an identity of the individual. The computer logic also includes computer readable program code for causing the computer to request a biometric sample from the individual and to store the biometric sample in the record.

In a further embodiment of the present invention, there is provided a method for causing a computer to enroll a user in a biometric authentication system. The method includes requesting an identifier from the individual, and creating a record in a database at a location indexed by the identifier, the record being disassociated from an identity of the individual. The method further includes requesting a biometric sample from the individual and storing the biometric sample in the record.

In yet another embodiment of the present invention, there is provided a system for enrolling an individual in a biometric authentication system. The system includes a first query engine operable to request an identifier and a biometric sample from the individual. Also included is a database server operable to create a record at a location indexed by the identifier, the record being disassociated from an identity of the individual, and to store the biometric sample in the record.

An advantage of the present invention is that it provides a higher degree of user authenticity than user ids and passwords.

Another advantage of the present invention is that it strikes a balance between an entity's need to authenticate users of its services or computing and other facilities, and individuals' need for having non-invasive, biometric prints that cannot be misused by third parties with fraudulent intentions.

Another advantage of the present invention is that there is no linkage of the biometric to an individual.

Yet another advantage of the present invention is that it can be used to provide brand protection to an entity, customer confidence and trust, and a non-repudiation factor for the transactions of the user.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. In the drawings, the left-most digit of a reference number identifies the drawing in which the reference number first appears.

DETAILED DESCRIPTION

I. Overview

Figure 1:
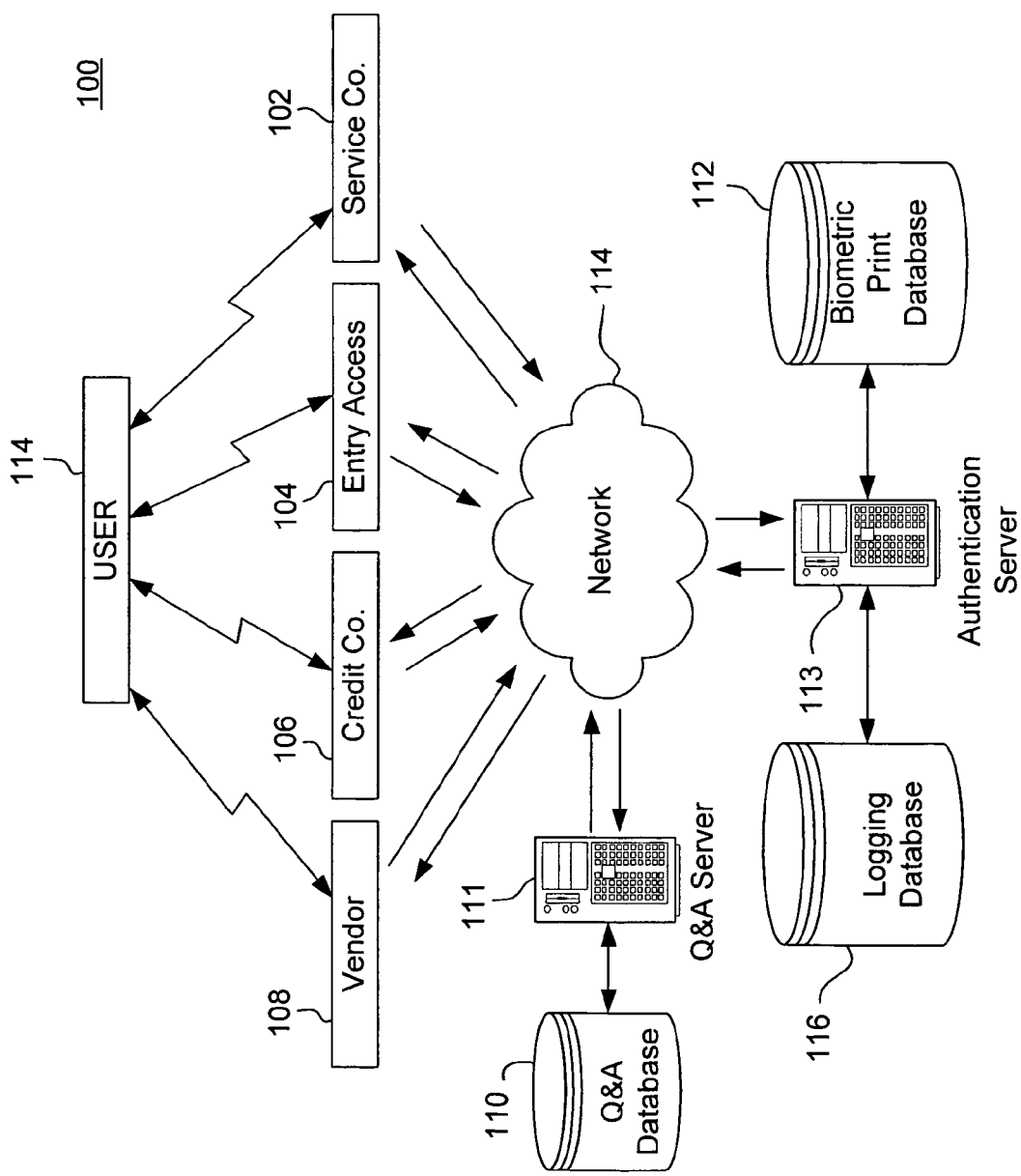
FIG. 1 is a system diagram of an exemplary authentication system in which the present invention, in an embodiment, would be implemented.

The present invention will be described in terms of an exemplary authentication system in which the present invention, in an embodiment, would be implemented. This is for convenience only and is not intended to limit the application of the present invention. It will be apparent to one skilled in the relevant art(s) how to implement the following invention in alternative embodiments (such as, without limitation, for use with portable handheld devices, personal computers, mobile phones, landline and wireless Internet browsers, access point devices, and the like, and using such unique biological features as voice, eyes, fingerprints, and even the shape of a hand).

The term "user", "end user", "consumer", "customer", "participant", "owner", "requester" and/or the plural form of these terms are used interchangeably herein to refer to those persons or entities capable of accessing, using, being affected by and/or benefiting from the present invention.

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., a rewards, charge, credit, debit, prepaid, telephone, embossed, smart, magnetic stripe, bar code, transponder or radio frequency card). As will be explained in more detail below, a biometric for purposes of the present invention, also can be used as a factor in authentication in combination with the other types of account numbers such as those noted above.

The terms "biometric print", "biometric sample", and/or "biological feature sample" may be used interchangeably with each other and shall mean any a measurement of a physical/biological feature or repeatable action of an individual. For example, a biometric print may be a retinal scan, hand geometry, iris scan, fingerprint patterns, facial characteristics, DNA sequence characteristics, voice prints, and hand written signature.

Furthermore, the terms "business", "merchant", "vendor", "service" and/or "representative" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an online merchant or the like.

Generally, the present invention is directed to a system, method and computer program product for disassociating an owners' biometric data with their primary identity information (such as name, address, social security number, and employee number) thus thwarting fraudulent activity. A biometric print is captured at enrollment time in a known fashion, and stored in a database. A key identifies a record in a database for the particular individual. Only the entity administering the enrollment (e.g., a hiring corporation) can use the key to associate back to an individual's record. Furthermore, the individual's primary information is not stored in the same record. Instead, an attribute of the record stores a value corresponding to a biometric print.

The key or the unique identifier unambiguously refers to the record of the individual who "owns" the biometric print. The key is generated by converting the identifying information using well-known encryption or hashing techniques (e.g., extendible, linear, chaining, and bucket hashing). The encrypted or hashed value can be based on various data such as a brokerage account number, a credit card account number, a phone number or a transaction number based on the business itself. Preferably, the key is a hashed value of a unique identifier which is untraceable to anyone other than the entity.

The biometric print can be any physical (i.e., biological) feature or repeatable action which identifies a human from a measurement such as hand geometry, retinal scan, iris scan, fingerprint patterns, facial characteristics, DNA sequence characteristics, voice prints, hand-written signature and the like.

An enrollment phase process collects the biometric print and performs the verification process. If the user passes the verification, the enrollment data is stored in a record on a database, the record being disassociated from the identity of the user. Then, a validation phase process receives an authentication request, and requests a biometric print sample and identity information from a user. The identity information is processed, for example by a hashing function, and sent to an application which compares the biometric print sample and the identity information to the enrollment data. In alternate embodiments, the key is transmitted with the biometric print sample or separately therefrom.

If a positive match is made the system or the human representative is notified and a requested transaction will be permitted. A match provides a second factor authentication and a non-repudiation audit trail in addition to granting access to perform the requested transaction.

Advantageously, no personal information is stored with the biometric print. Thus nothing can be traced back to the individual in the event the database is compromised or stolen. In order to make the information useful to anyone other than the entity that captured the data, a hacker would need a key index data linking it to a credit card number or some other account number. Furthermore, if the key is a cryptographically calculated value based on a hashing algorithm, decoding it would add an additional layer of security.

II. System

FIG. 1 is a system diagram of an exemplary authentication system 100 in which the present invention, in an embodiment, would be implemented. A user 114 is in communication with an entity such as a vendor 108, business 106, or service 102, or device 104.

The vendor 108, business 106, device 104, and/or service 102 are in communication with two database servers, a question and answer database server 111 and a biometric print authentication server 113 via a network 114. The question and answer database server 111 is in communication with a question and answer database 110, and the biometric print authentication server 113 is in communication with a biometric print database 112 and a logging database 116.

The interface for obtaining a biometric print from user 114 is not shown. The structure of such an interface depends on the biological feature being measured. For example, if the transaction requested is to pass through a door, the interface can be a retinal scanner or fingerprint scanner near the door. If the biological feature is voice, the interface can be embodied as a microphone on a user's computer, on a remote server, mobile device, and the like.

III. Process

Figure 2:
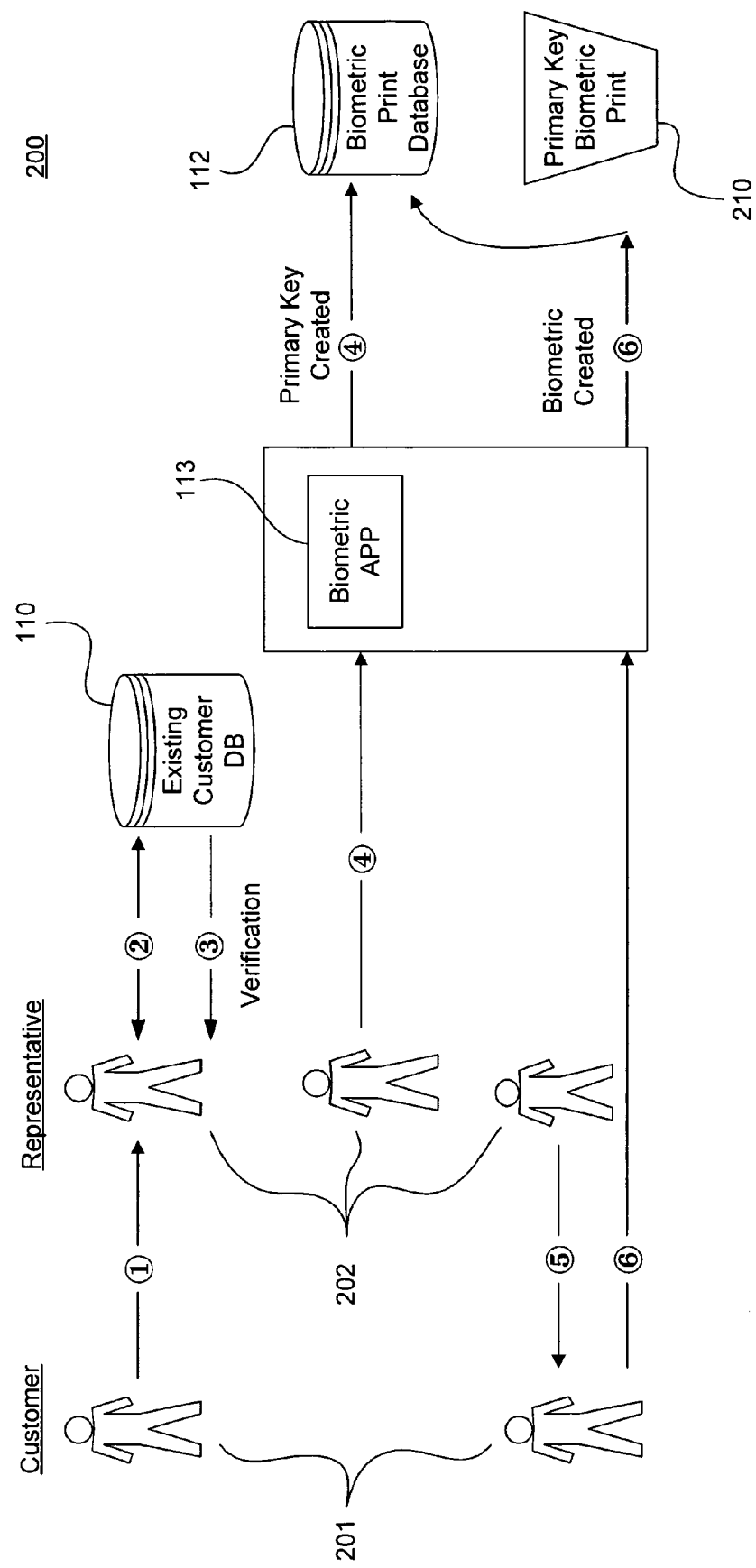
FIG. 2 is a block diagram illustrating an enrollment sequence in an authentication system using biometrics as a factor in accordance with the present invention.

FIG. 2 is a block diagram illustrating an initial enrollment sequence 200 in the authentication system using biometrics as a factor in accordance with the present invention. The flow begins with a customer 201 requesting to enroll for a secure authentication service. The representative 202, verifies the customer's identification by asking the customer 201 a question, such as the customer's date of birth (DOB), account number, account value, and/or spouse's social security number.

An existing customer database 110, which contains the correct responses to the representative's questions, is accessed to verify the information provided by customer 201. Once verified, representative 202 creates a biometric primary key 210, which is used as an index to records stored on biometric print database 112. In one embodiment the representative can enter the customer's account number, which is used by a biometric application executed on the authentication server 113 to generate the primary key for locating and/or storing a biometric print. Alternatively, the key can be generated automatically by, for example, customer database 110 or another computer application executed on a computer (not shown) on network 114.

Representative 202 prompts the customer for a biological feature sample, such as a voice sampling. The customer's prompts are captured by the biometric application on authentication server 113, which converts the samples to a biometric print, and stores the biometric print in biometric print database 112.

Figure 4:
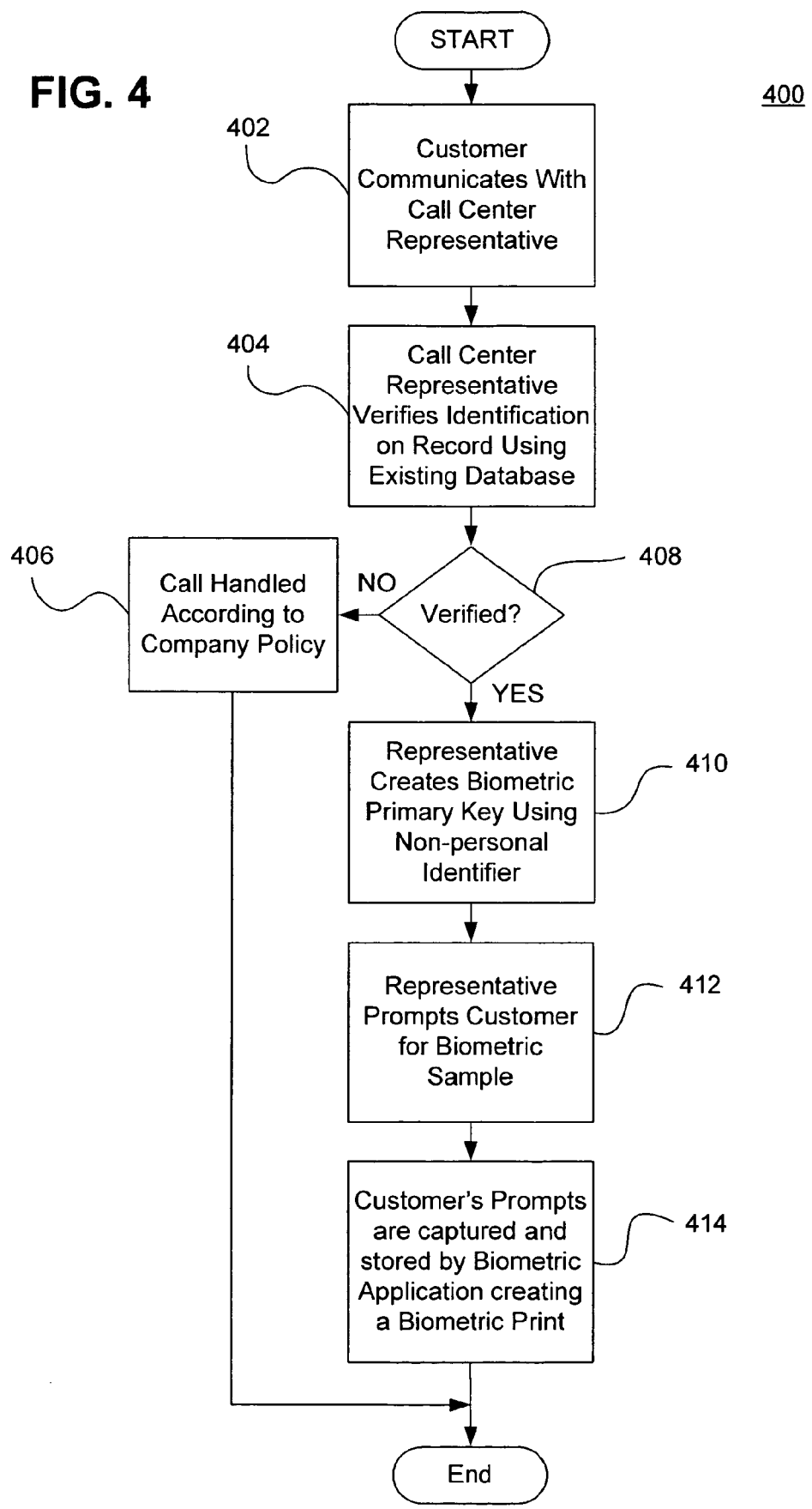
FIG. 4 is a flowchart illustrating a process for enrollment for a secure authentication service using biometrics as a factor in accordance with one embodiment of the present invention.

FIG. 4 is a flowchart illustrating the process for enrollment for a secure authentication service using biometrics as a factor in accordance with one embodiment of the present invention. At step 402, customer 201 communicates with representative 202. Next, call center representative 202 verifies the customer's identification on record using an existing database (e.g., Q&A Database 110), as shown at steps 404 and 408. At step 406, if the customer cannot be verified, the transaction is denied and handled appropriately, for instance by asking customer 201 to resubmit his or her response or disconnecting the call.

If customer 201 is verified, representative 202 creates a biometric primary key using a non-personal identifier in step 410. As mentioned above, key 210 can be generated using any known encryption or hashing techniques which can be implemented on a computer such as Q&A Server 111. At step 412, the representative prompts the customer for a biological feature sample, such as a voice sample. In step 414, the customer's biological feature sample is captured by a biometric application on Authentication Server 113, thereby creating a biometric print which can stored in a database and located using the identification information received in step 404.

It should be understood that call-in center representative 202 can be replaced by a machine, such as a computer programmed to automatically request information, respond automatically, and process a user's identity and biometric information. Such voice-recognition systems and auto-responders can be implemented in hardware or software on any computer within system 100.

Figure 3:
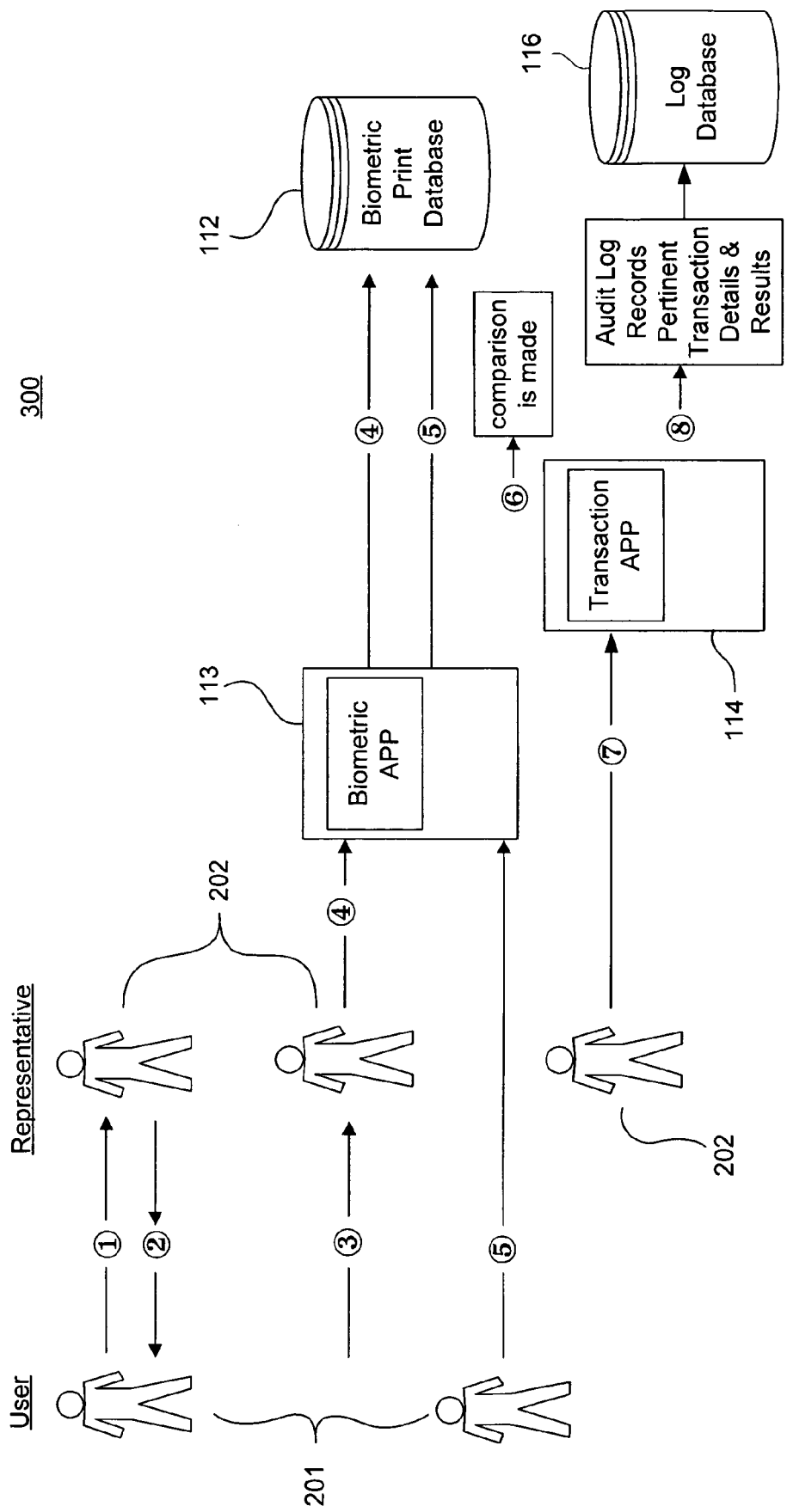
FIG. 3 is a block diagram illustrating an authentication sequence in an authentication system in accordance with one embodiment of the present invention.

FIG. 3 is a block diagram illustrating an authentication sequence 300 in an authentication system in accordance with one embodiment of the present invention. The authentication service initiates when a customer 201 communicates with a representative 202 to perform a transaction. Representative 202 prompts the customer for the customer's identification. As mentioned above, the customer's identification can be, for example, the customer's date of birth (DOB), account number, account value, and/or spouses social security number.

Customer 201 provides the identification to representative 202, who forwards that information to biometric application 113. Customer 201 is then prompted to provide a biometric sample, which is captured by the biometric application 113. Biometric application 113 searches biometric print database 112 using the identifier to locate a record. If the record is found and contains a previously-stored biometric print, a comparison is made between the customer's biometric sample and the biometric print stored in biometric print database 112. If the comparison is positive, then user 201 is allowed to proceed with the transaction on transaction application server 114.

If a match of the customer's biometric sample is not found in biometric print database 112, the transaction is denied. The transaction and result are logged into log database 116, which can be used during audits and/or as a non-repudiation record in the event the customer believes their record or statement is wrong, or needs more information on a particular transaction.

Figure 5:
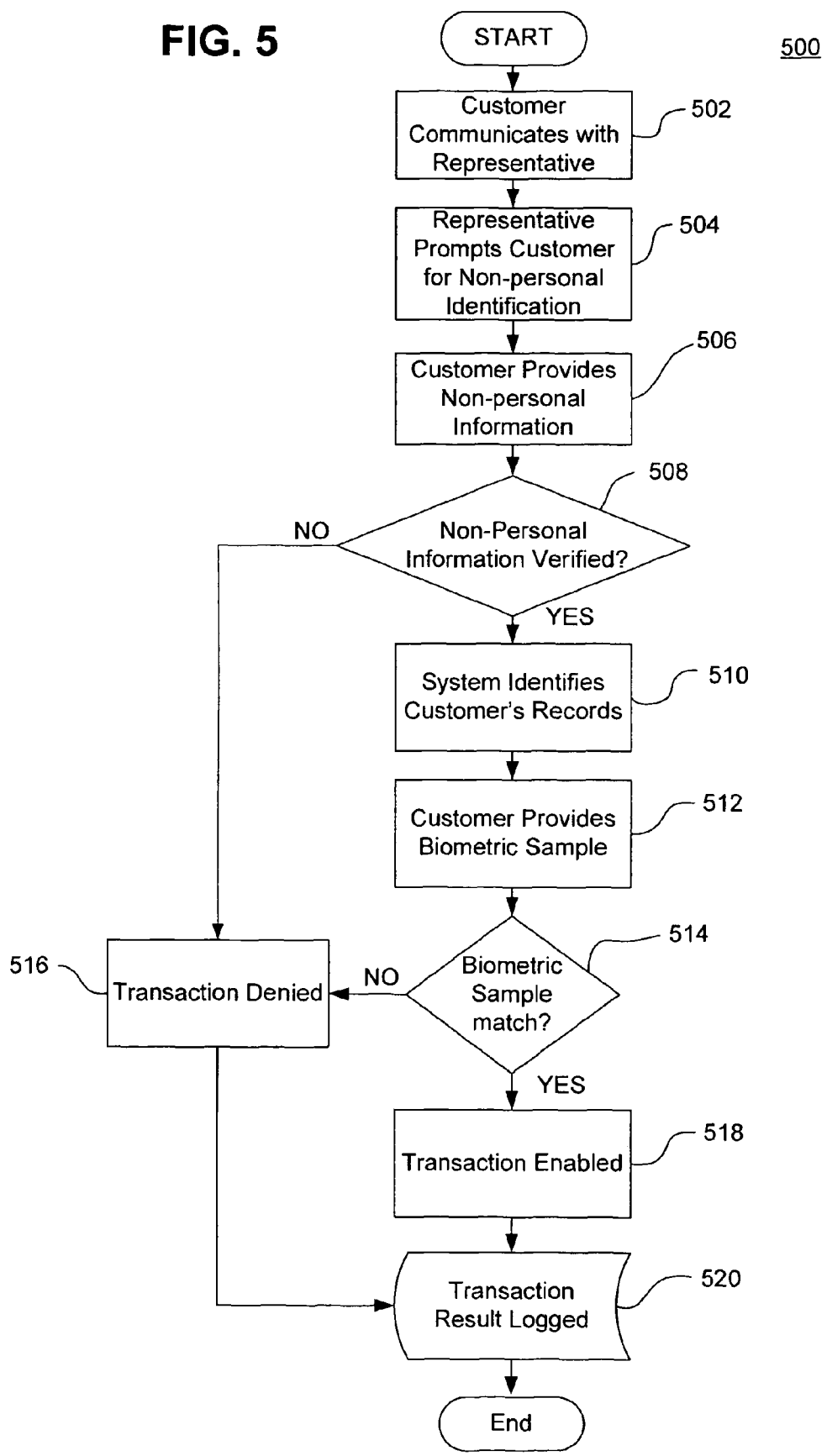
FIG. 5 is a flowchart illustrating a process for authentication in accordance with one embodiment of the present invention.

FIG. 5 is a flowchart illustrating a process for authentication in accordance with one embodiment of the present invention. In step 502, the customer communicates with a call center representative. The representative prompts the customer for a non-personal identifier, as shown in step 504. In step 506, the customer provides a unique identifier, which is verified at step 508 by the representative using Q&A database 111 as described above in connection with FIGS. 2 and 3.

If the identification does not translate to a known biometric key, then the transaction is denied as shown in step 516. If the identification can be verified in step 508, then the biometric application on Authentication Server 113 points to the customer's records as shown at step 510.

Next, the customer provides a biometric feature sample in step 512 which is compared by biometric application 113 to the biometric print stored in database 112 that is pointed to by the biometric key in step 514. If the biometric sample does not match a biometric print previously-stored in biometric print database 112, then the transaction is denied in step 516. If the biometric sample matches the stored biometric print, then a requested transaction is enabled in step 518. In step 520, the authentication transactions are then logged into logging database 116, thereby recording the details of the transactions and the results.

IV. Exemplary Implementations

The present invention (i.e., system 100, architectures 200, 300 and processes 400, 500) or any part(s) or functions thereof) may be implemented using hardware, software or a combination thereof and may be implemented in one or more computer systems or other processing systems. However, the manipulations performed by the present invention were often referred to in terms, such as adding, comparing, inputting, or requesting which are commonly associated with mental or physical operations performed by a human operator. No such capability of a human operator is necessary, or desirable in most cases, in any of the operations described herein which form part of the present invention. Rather the operations are machine operations. Useful machines for performing the operation of the present invention include general purpose digital computers or similar devices.

Figure 6:
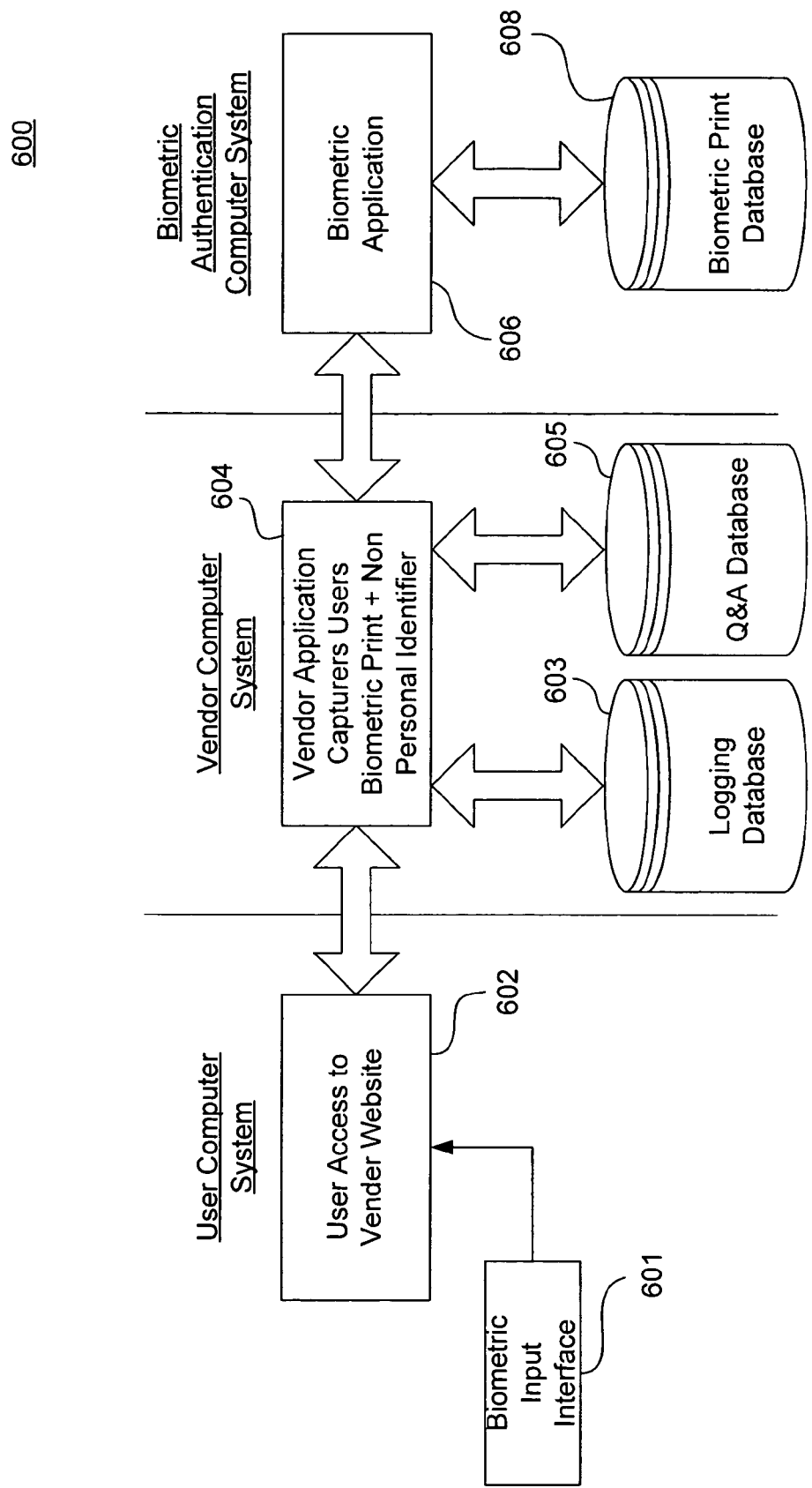
FIG. 6 is an exemplary computer system useful for implementing the present invention.

In fact, in one exemplary embodiment, the invention is directed toward one or more computer systems capable of carrying out the functionality described herein. An example of a computer system 600 is shown in FIG. 6. As shown in FIG. 6, computer system 600 can be divided into three subsystems (which as explained below can also be regarded individually as a computer system), a user computer system, a vendor computer system and a biometric authentication computer system. The user computer system has access to a vendor website 602, such as via a WWW browser. In addition, the computer includes a biometric print interface 601 for receiving a biometric print.

Application 604 in a vendor computer system captures a user's identification information and compares it to data stored in a question and answer database 605. The application 604 also captures the user's biometric print. The biometric print is forwarded to the biometric authentication system, which includes a biometric application 606 and a biometric print database 608.

In one exemplary implementation, a voice biometric print is used as the biometric in a monetary transaction scenario. If, for example, a user wishes to transfer a large sum of money between bank accounts, the user may call his or her advisor on the phone. The advisor will then ask the user to speak a particular phrase, which would be captured as a voice-print and sent to the biometric print storage database with his account number.

The account number is cryptographically hashed and used as the primary key for the voice print. The recently captured "phrase" print is compared to the print that was used for that individual customer at enrollment time.

If a match exists, the transfer is completed as requested. Thus, there is no personal identifier linked to the voice-print during the transmission of data at any time during the transaction.

Even if the hashed value were deciphered and the user's identifier is compromised (which is highly unlikely if implemented properly), the second level of authentication, namely, using a biometric feature as a factor for authentication, makes it impossible to compromise a user's identity information because even if the database were hacked, the only elements compromised would be the account hashed value and the biometric print—no names, addresses, etc., thus preventing identity theft. Thus, even if the technological measures controlling access to the biometric print or the key are defeated, neither the biometric print nor the key can be used to obtain an individual's personal information.

The fact that a biometric print is indisputably that of the customer also makes the transaction non-reputable. A logging database 603 can be added to the system 600, which is operable to log the authentication request dialog, thereby creating an audit trail. Thus, it would be impossible for a customer to legitimately dispute a transaction was authorized if the user's biometric print were captured with the associated audit info of the transaction. The physical location of the logging database is not critical. Indeed, the logging database can be a separate subsystem (not shown) which has the sole function of logging authentication requests and/or transactions. In the embodiment illustrated in FIG. 6, logging database 603 is implemented on the vendor computer system. Alternatively, logging database 603 could be implemented on the Biometric Authentication Computer System or on a third party system (not shown) via well known communication links.

The service can be transparent to the public and as part of both a security and storage infrastructure. However, an entity might choose to store the biometric prints at a third partner site enabling it real-time for verification during the transaction.

Figure 7:
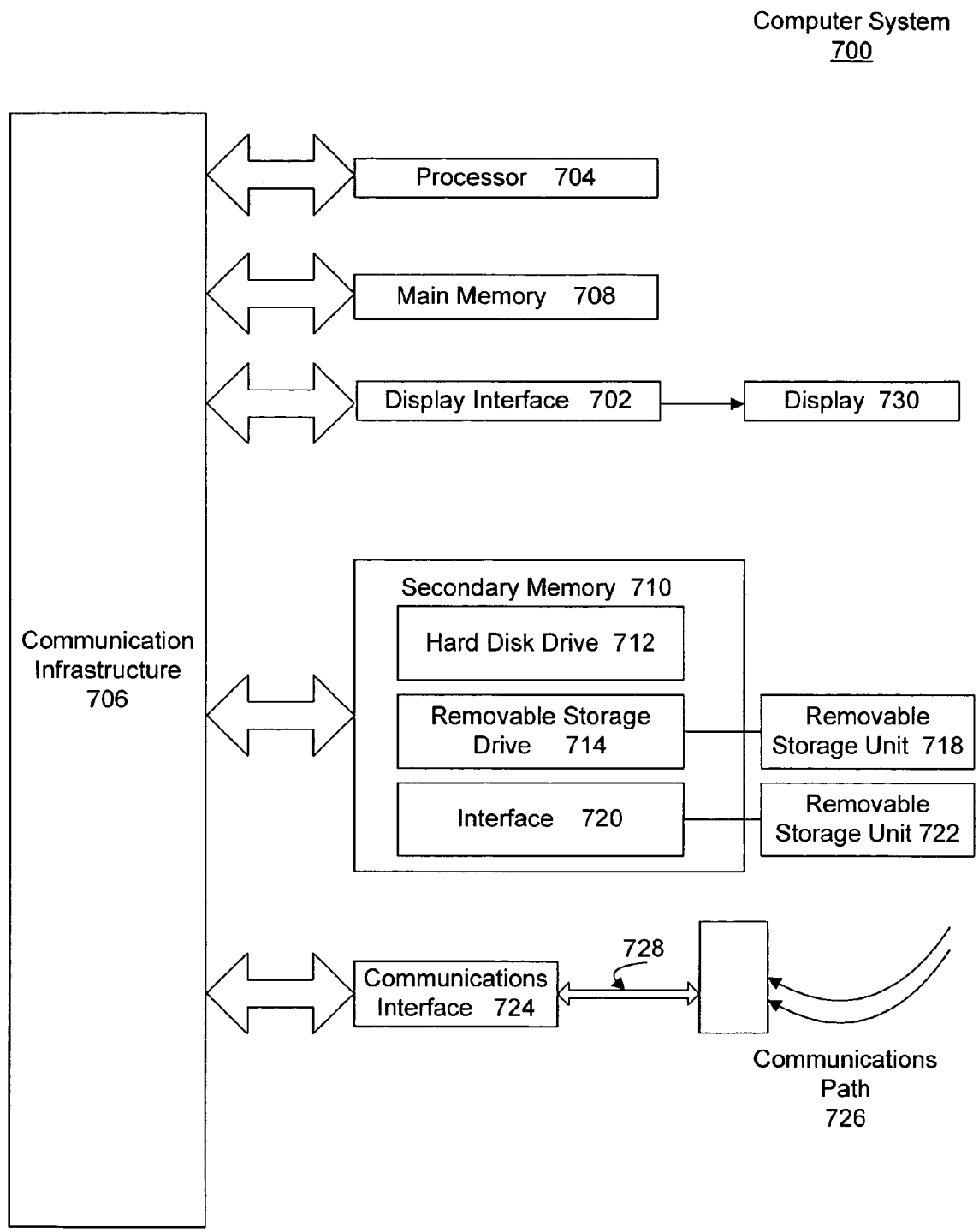
FIG. 7 is another exemplary computer system useful for implementing the present invention.

As illustrated above, computer system 600 can include one or more computer subsystems (which may individually be referred to as a computer system). In FIG. 6 for example, computer system 600 includes a user computer system, a vendor computer system and a biometric authentication computer system. The general configuration of each computer system is illustrated in FIG. 7. Each computer system can include one or more processors, such as processor 704. The processor 704 is connected to a communication infrastructure 706 (e.g., a communications bus, cross-over bar, or network). Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices such as biometric input interface 601. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 714, a hard disk installed in hard disk drive 712, and signals 728. These computer program products provide software to computer system 700. The invention is directed to such computer program products.

Computer programs (also referred to as computer control logic or application) are stored in main memory 708 and/or secondary memory 710. Computer programs may also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer program product comprising a computer usable medium having control logic stored therein for causing a computer to authenticate a requestor using a previously-stored biometric print, said control logic comprising:

computer readable program code means for causing the computer to store a plurality of records in a biometric print database, each record containing a previously-stored biometric print corresponding to an individual, and being disassociated from an identity of the individual stored in a customer database, the customer database and the biometric print database being de-linked;

computer readable program code means for causing the computer to request an identifier from the requestor;

computer readable program code means for causing the computer to request a biometric sample from the requestor;

computer readable program code means for causing the computer to encrypt the identifier after receipt;

computer readable program code means for causing the computer to match the encrypted identifier, in its encrypted form, with one of the plurality of records that corresponds to the requestor, wherein the encrypted identifier is associated with the one of the plurality of records corresponding to the requestor; and computer readable program code means for causing the computer to authenticate the requestor in response to the biometric sample matches matching the previously-stored biometric print, whereby an authenticated requestor is permitted to perform a transaction.

2. The computer program product according to claim 1, wherein the causing the computer to match the encrypted identifier, in its encrypted form, with one of the plurality of records that corresponds to the requestor comprises:

computer readable program code means for causing the computer to hash the identifier and use the hashed identifier to locate one of the plurality of records containing the previously-stored biometric print.

3. The computer program product according to claim 1, further comprising:

computer readable program code means for causing the computer to store a log of an authentication request.

4. A method for authenticating a requestor using a previously-stored biometric print, comprising:

storing, by a computer, a plurality of records in a biometric print database, each record containing a previously-stored biometric print corresponding to an individual and being disassociated from an identity of the individual stored in a customer database, the customer database and the biometric print database being de-linked;

requesting an identifier from the requestor;

requesting a biometric sample from the requestor;

encrypting, by the computer, the identifier after receipt;

matching, by the computer, the encrypted identifier, in its encrypted form, with one of the plurality of records that corresponds to the requestor, wherein the encrypted identifier is associated with the one of the plurality of records corresponding to the requestor; and authenticating, by the computer, the requestor in response to the biometric sample matching the previously-stored biometric print, whereby an authenticated requestor is permitted to perform a transaction.

5. The method according to claim 4, further comprising the steps of: hashing, by the computer, the identifier to create a hashed identifier; and locating the record containing the previously-stored biometric print using the hashed identifier.

6. The method according to claim 4, further comprising the step of: storing, by the computer, a log of an authentication request.

7. A system for authenticating a requestor using a previously-stored biometric print, comprising:

a biometric print database for storing a plurality of records, each record containing a previously-stored biometric print corresponding to an individual and being disassociated from an identity of the individual stored in a customer database, the customer database and the biometric print database being de-linked;

a query engine operable to request a user identifier and a biometric sample from the requestor; and an authentication engine operable to encrypt the identifier after receipt, and then match the encrypted identifier, in its encrypted form, with one of the plurality of records that corresponds to the requestor, wherein the encrypted identifier is associated with the one of the plurality of records corresponding to the requestor, and to authenticate the requestor in response to the biometric sample matching the previously-stored biometric print, whereby an authenticated requestor is permitted to perform a transaction.

8. The system according to claim 7, further comprising:

a hashing engine operable to hash the identifier to create a hashed identifier, wherein the hashed identifier is used to locate the record containing the previously-stored biometric print.

9. The system according to claim 7, further comprising:

a log database operable to store a log of an authentication request.

* * * * *